US009592972B1

(12) United States Patent
Digmann et al.

(10) Patent No.: US 9,592,972 B1
(45) Date of Patent: Mar. 14, 2017

(54) SEALING MEMBERS FOR WEATHER BARRIERS

(71) Applicants: Charles Digmann, Dubuque, IA (US);
Charles J. Ashelin, Dubuque, IA (US);
Frank Heim, Platteville, WI (US);
Gary Borgerding, Dubuque, IA (US);
Ryan Withrow, Platteville, WI (US)

(72) Inventors: Charles Digmann, Dubuque, IA (US);
Charles J. Ashelin, Dubuque, IA (US);
Frank Heim, Platteville, WI (US);
Gary Borgerding, Dubuque, IA (US);
Ryan Withrow, Platteville, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 14/833,366

(22) Filed: Aug. 24, 2015

(51) Int. Cl.
*E04D 13/18* (2014.01)
*E04H 14/00* (2006.01)
*B65G 69/00* (2006.01)

(52) U.S. Cl.
CPC ................... *B65G 69/008* (2013.01)

(58) Field of Classification Search
CPC ..... B65G 69/00; B65G 69/003; B65G 69/008
USPC ............. 52/173.1, 173.2, 2.11, 2.12
See application file for complete search history.

(56) References Cited

U.S. PATENT DOCUMENTS

| 3,322,132 A | * | 5/1967 | Rieder | ................ B65G 69/008 135/123 |
| 3,403,489 A | * | 10/1968 | Frommelt | ............ B65G 69/008 52/173.2 |
| 3,500,599 A | | 3/1970 | Sciolino | |
| 3,638,667 A | * | 2/1972 | Frommelt | ............ B65G 69/008 135/123 |
| 3,792,559 A | * | 2/1974 | Frommelt | ............ B65G 69/008 52/173.2 |
| 3,854,257 A | | 12/1974 | Lobel | |

(Continued)

FOREIGN PATENT DOCUMENTS

| WO | 2013036634 | 3/2013 | |
| WO | WO 2013036634 A1 | * 3/2013 | ........... B65G 69/008 |

OTHER PUBLICATIONS

International Searching Authority, "International Search Report and Written Opinion," issued in connection with application No. PCT/US2016/048186 on Nov. 16, 2016, (15 pages).

*Primary Examiner* — Joshua J Michener
*Assistant Examiner* — Keith Minter
(74) *Attorney, Agent, or Firm* — Hanley, Flight & Zimmerman, LLC

(57) ABSTRACT

Example lateral sealing members for use with weather barriers are disclosed. An example lateral sealing member includes a lateral sealing member being vertically elongate. The lateral sealing member has a J-shaped cross-section extending between an attached end and a tip of the lateral sealing member. The lateral sealing member has a groove along the tip. The lateral sealing member is movable between an activated configuration and a relaxed configuration. The tip to extend farther into a vehicle pathway when the lateral sealing member is in the relaxed configuration than when the lateral sealing member is in the activated configuration. A tip seal is provided along the tip of the lateral sealing member. The tip seal is to protrude in the groove.

45 Claims, 16 Drawing Sheets

(56) References Cited

U.S. PATENT DOCUMENTS

| | | | |
|---|---|---|---|
| RE28,391 E * | 4/1975 | Frommelt et al. | B65G 69/008 52/173.2 |
| 3,875,954 A * | 4/1975 | Frommelt | B65G 69/008 135/115 |
| 3,915,183 A | 10/1975 | Frommelt | |
| 3,934,380 A | 1/1976 | Frommelt et al. | |
| 4,062,157 A | 12/1977 | Potthoff | |
| 4,213,279 A * | 7/1980 | Layne | B65G 69/008 52/173.2 |
| 4,328,273 A | 5/1982 | Yackiw | |
| 4,349,992 A | 9/1982 | Layne | |
| 4,365,452 A * | 12/1982 | Fillman | B65G 69/008 52/173.2 |
| 4,381,631 A * | 5/1983 | Frommelt | B65G 69/008 52/173.2 |
| 4,554,768 A * | 11/1985 | Srajer | B65G 69/008 160/243 |
| 4,574,543 A | 3/1986 | Crosson | |
| 4,601,142 A | 7/1986 | Frommelt | |
| 4,638,612 A * | 1/1987 | Bennett | B65G 69/008 14/71.5 |
| 4,679,364 A | 7/1987 | Fettig et al. | |
| 4,711,059 A * | 12/1987 | Layne | B65G 69/008 14/71.5 |
| 4,718,207 A | 1/1988 | Frommelt | |
| 4,724,648 A | 2/1988 | Diepholder | |
| 4,799,341 A | 1/1989 | Frommelt et al. | |
| 4,799,342 A * | 1/1989 | Klevnjans | E04F 10/04 52/173.2 |
| 4,805,362 A * | 2/1989 | Frommelt | B65G 69/008 52/173.2 |
| 4,825,607 A * | 5/1989 | Frommelt | B65G 69/008 49/505 |
| 4,873,800 A * | 10/1989 | Frommelt | B65G 69/008 52/173.2 |
| 4,873,801 A | 10/1989 | Winters | |
| 5,007,211 A | 4/1991 | Ouellet | |
| 5,125,196 A * | 6/1992 | Moody | B65G 69/008 52/173.2 |
| 5,174,075 A * | 12/1992 | Alten | B65G 69/008 14/71.5 |
| 5,174,084 A * | 12/1992 | Alten | B65G 69/008 14/71.5 |
| 5,185,977 A * | 2/1993 | Brockman | B65G 69/008 49/504 |
| 5,195,285 A | 3/1993 | Alten | |
| 5,282,342 A * | 2/1994 | Brockman | B65G 69/008 52/173.2 |
| 5,341,613 A * | 8/1994 | Brockman | B65G 69/008 52/173.2 |
| 5,394,662 A * | 3/1995 | Giuliani | E06B 7/22 52/173.2 |
| 5,553,424 A * | 9/1996 | Brockman | B65G 69/008 49/504 |
| 5,622,016 A * | 4/1997 | Frommelt | B65G 69/008 52/11 |
| 5,775,044 A * | 7/1998 | Styba | B65G 69/008 160/40 |
| 5,953,868 A * | 9/1999 | Giuliani | B65G 69/008 52/173.2 |
| 6,205,721 B1 * | 3/2001 | Ashelin | B65G 69/008 52/173.2 |
| 6,233,885 B1 * | 5/2001 | Hoffmann | B65G 69/008 52/173.1 |
| 6,425,214 B1 * | 7/2002 | Boffeli | B65G 69/008 52/173.2 |
| 6,854,224 B2 * | 2/2005 | Thill | B65G 69/008 52/173.2 |
| 7,185,463 B2 * | 3/2007 | Borgerding | B65G 69/008 52/173.2 |
| 8,307,588 B2 * | 11/2012 | Hoffmann | B65G 69/008 52/173.2 |
| 8,458,960 B2 * | 6/2013 | Digmann | B65G 9/008 52/173.2 |
| 8,887,447 B2 | 11/2014 | Hoffmann et al. | |
| 2004/0261335 A1 * | 12/2004 | Eungard | B65G 69/008 52/173.2 |
| 2006/0026912 A1 * | 2/2006 | Eungard | B65G 69/008 52/173.2 |
| 2006/0032159 A1 * | 2/2006 | Eungard | B65G 69/008 52/173.2 |
| 2006/0090407 A1 | 5/2006 | Hoffmann | |
| 2006/0272222 A1 * | 12/2006 | Hoffmann | B65G 69/008 52/2.12 |
| 2007/0283636 A1 * | 12/2007 | Bernacki | B65G 69/008 52/173.2 |
| 2012/0255685 A1 | 10/2012 | Kniese | |
| 2013/0221624 A1 | 8/2013 | Digmann et al. | |
| 2015/0007511 A1 | 1/2015 | Digmann et al. | |
| 2015/0007512 A1 * | 1/2015 | Digmann | E04H 14/00 52/173.2 |
| 2015/0376892 A1 | 12/2015 | Digmann et al. | |

* cited by examiner

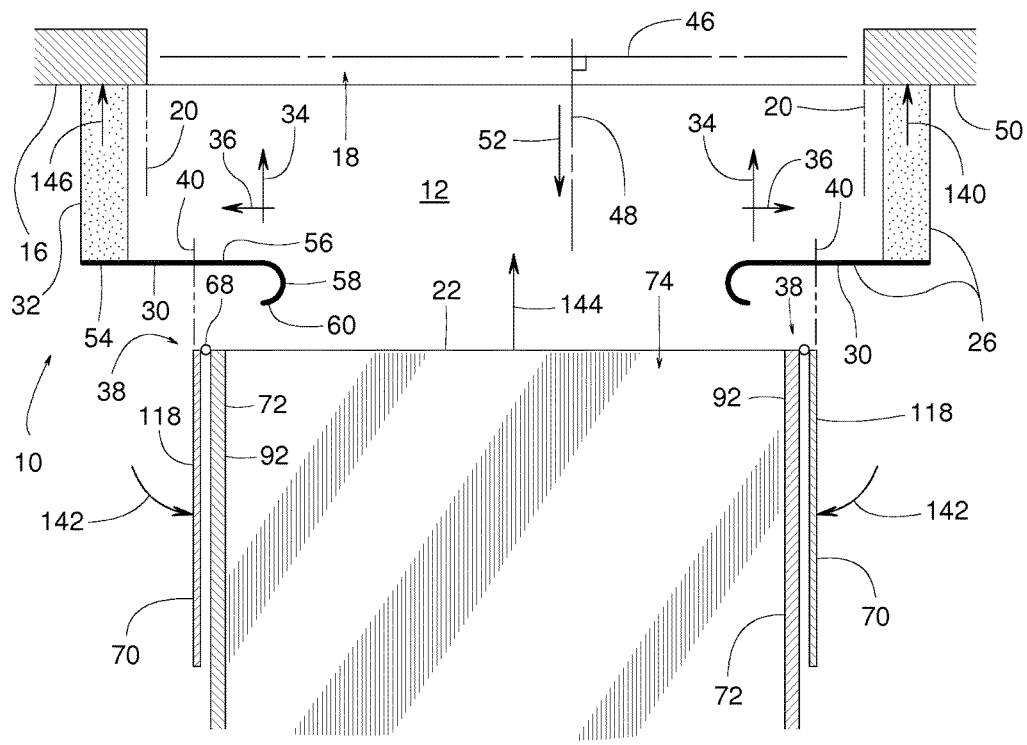
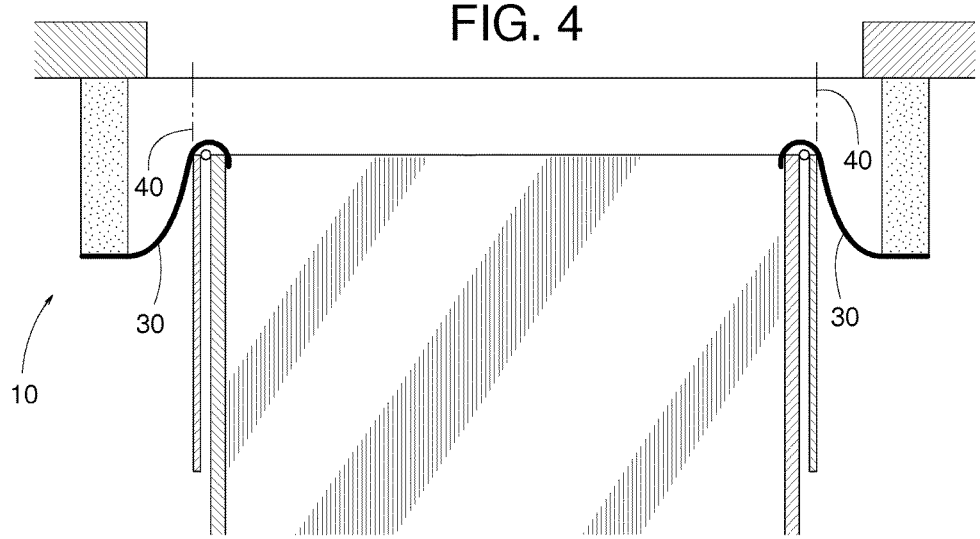

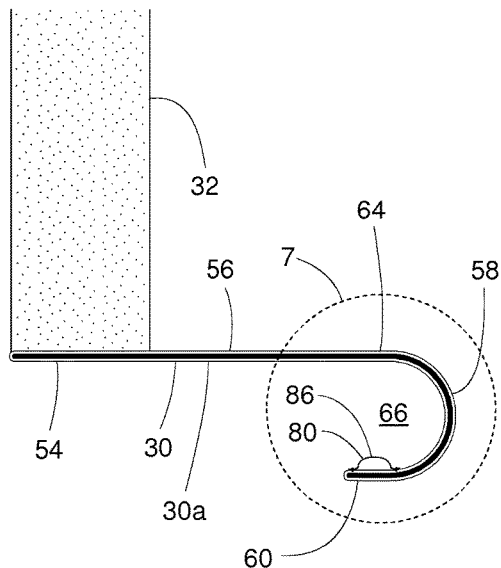
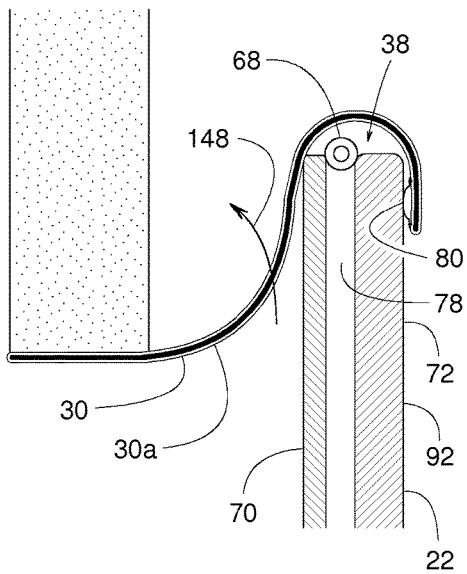
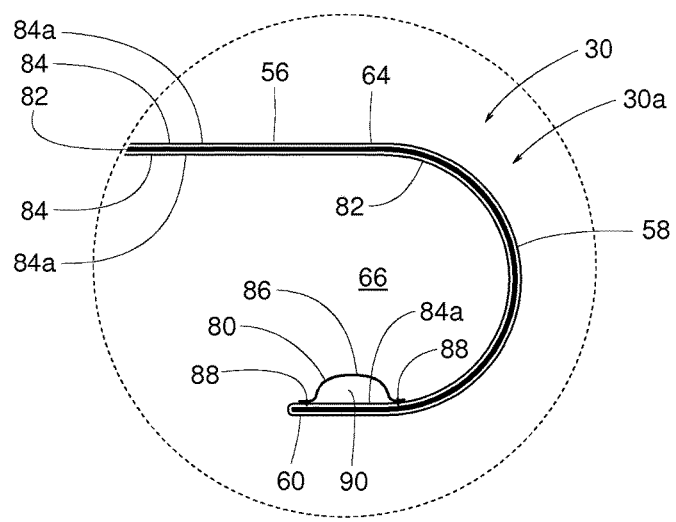

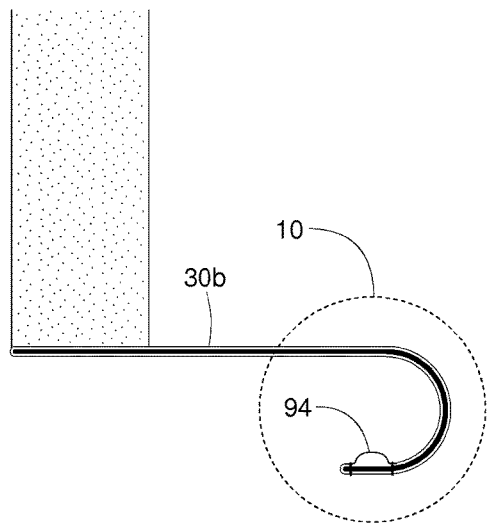
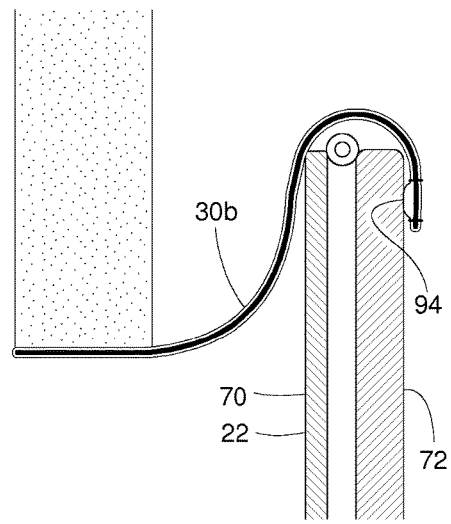
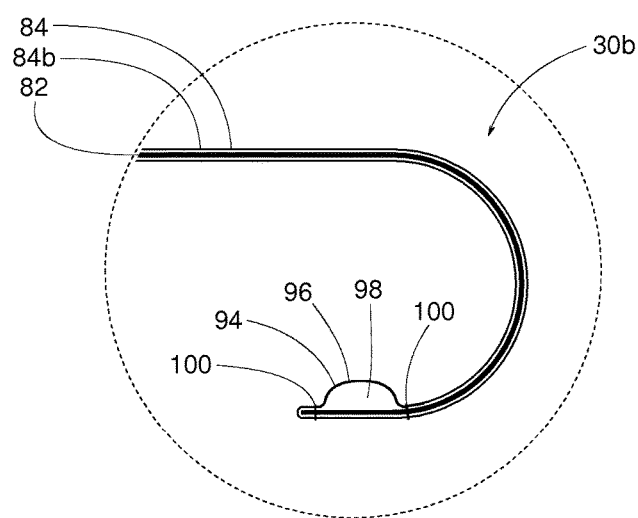

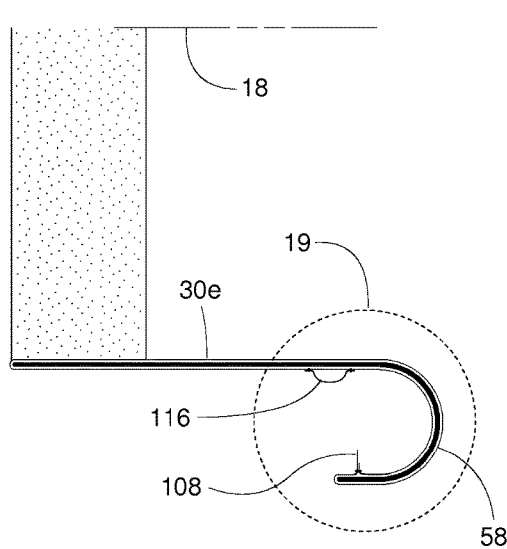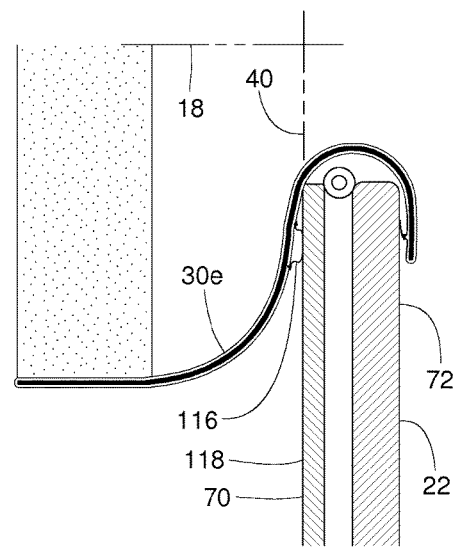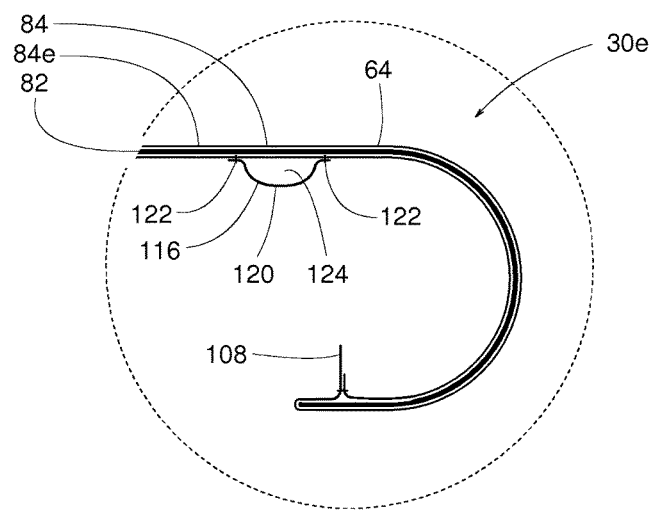

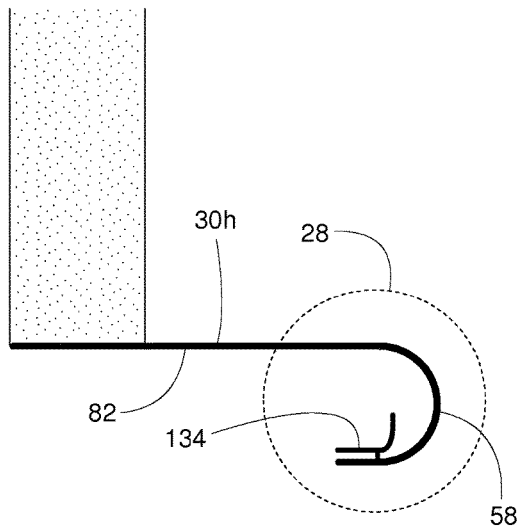
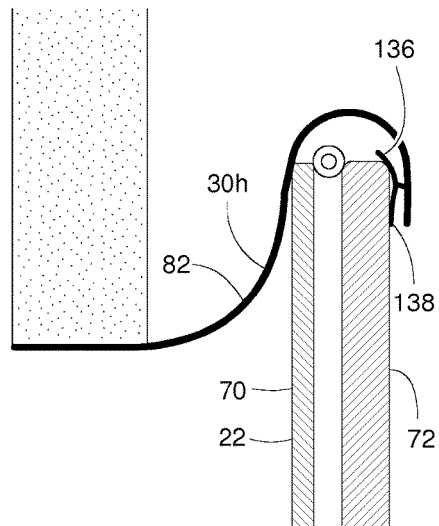
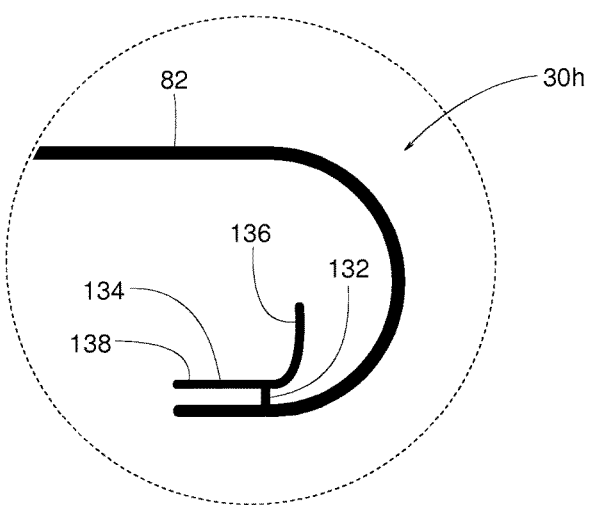

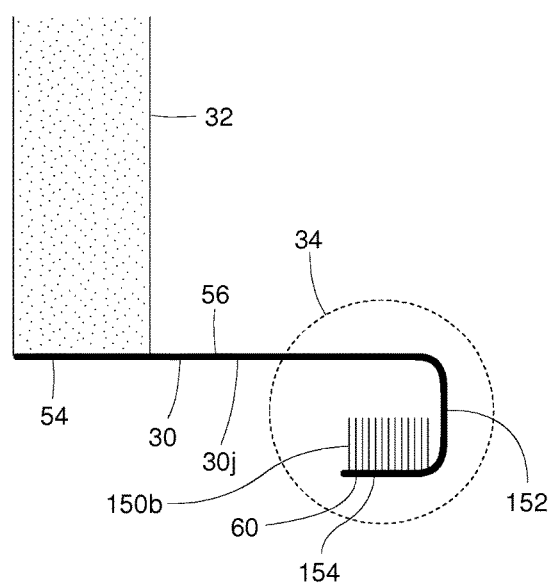
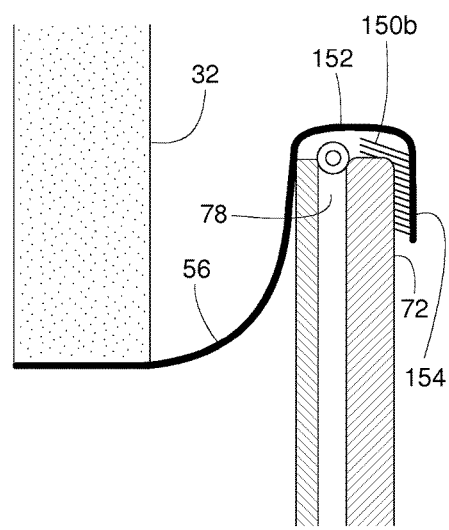
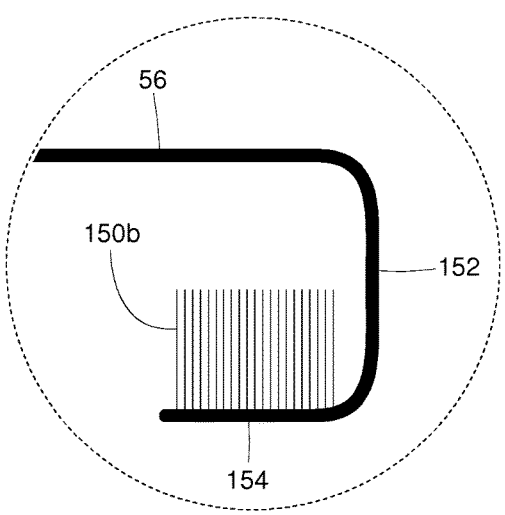

SEALING MEMBERS FOR WEATHER BARRIERS

FIELD OF THE DISCLOSURE

This disclosure relates generally to sealing members and, more specifically, to sealing members for weather barriers.

BACKGROUND

Dock weather barriers, such as dock seals and dock shelters, prevent the ingress of outdoor environmental conditions or contaminants (e.g., rain, snow, wind, hot/cold temperatures, insects, animals, etc.) into the interior of a building and cargo area of a vehicle during the loading and/or unloading of the vehicle. Dock shelters and seals also prevent the egress of conditioned air from within a building and/or a vehicle cargo area to the outdoor environment.

Some example dock seals use side members having a compressible foam core or body surrounded by a coated fabric or vinyl outer layer. The foam core provides sufficient structural rigidity to enable the side members to be extended a short distance from the building wall surrounding the loading dock. The coated fabric outer layer protects the foam core from outdoor environmental conditions (e.g., moisture), provides wear resistance to repeated impacts from the rear portions of vehicles, and/or may provide desirable aesthetic qualities. Additionally, a header structure may span between the side members along a top portion of the loading dock opening. The header structure may be another compressible member similar in construction to the side members and, in some cases, may include a weighted fabric curtain that hangs downwardly to contact the top of a truck trailer to form an environmental barrier along the top of the trailer.

Another type of dock seal may use inflatable side members and a header structure having internal compressible resilient pads, which provide some degree of side member compressibility when the side members are in a deflated condition. In either case, when the rear portion of a vehicle (e.g., a truck trailer) is backed into either foam or inflatable dock seal side and header members, the side and header members are compressed toward the building wall to form a seal along the lateral and top back edges of the vehicle. If present, the head curtain sweeps along the top of the trailer to form a seal at the top of the trailer between the side members. Dock seals typically consume a relatively small amount of wall space and can provide a relatively high quality seal between the rear edges of a vehicle and the outside building wall surrounding the dock. However, when the dock seal side members are compressed, they may be displaced into or otherwise encroach on the opening to the rear of the docked vehicle. As a result, the compressed side member may interfere with operation of a fork lift and/or an operator during loading and unloading activities. In addition, inflatable dock seals may be susceptible to power losses and/or may tear and compromise the ability of the side members to inflate to provide an acceptable seal.

In contrast to dock seals, some example dock shelters use side members that are mounted to the outside building wall surrounding the loading dock. The side members are spaced well to the outside of the sides of a docked vehicle. The side members are configured to extend (i.e., to be cantilevered) an appreciable distance from the outside building wall, particularly in cases where a dock leveler protrudes from the dock opening. The side members may also support flexible seal members or side curtains extending inwardly from the side members across at least a portion of the opening defined by the side members. When a vehicle such as, for example, a truck trailer, is backed into the opening of the dock shelter, the inwardly facing edges of the seal members or side curtains resiliently deflect and sweep against the lateral sides of the trailer to form an environmental barrier therebetween. As with dock seals, dock shelters also typically include a header structure, which may include a head curtain, to form an environmental barrier along the top edge of the rear of the vehicle.

In contrast to dock seals, dock shelters typically provide unobstructed access to a vehicle cargo area opening (i.e., there are no foam pads or the like to be compressed and displaced into the opening). However, most known dock shelter side members are constructed using rigid wood, fiberglass or metal frames capable of supporting the significant weight of the seal members or side curtains, which are usually held at an appreciable distance (e.g., several feet) from the building wall. Such side members may be permanently deformed if they are impacted by a vehicle. Accordingly, bumpers or stops may be mounted to the lower edge of the dock shelter to prevent a vehicle (e.g., a truck trailer) from impacting and damaging the rigid shelter.

The rigid side members used to implement these dock shelters are also typically mechanically coupled via the header and/or another rigid member to provide increased lateral rigidity to the dock shelter to minimize the ability of the side members to move from side-to-side. Because of this, the side members typically have to be mounted relatively far apart to accommodate a wide range of possible off-center vehicle positions. This relatively large distance between the rigid side members consumes a significant and, thus, expensive amount of building wall space for each loading dock opening.

Some example dock shelters having impactable side members. The impactable side members are similar to those used with dock seals and typically use a foam core or body surrounded by a coated fabric outer layer. Seal members or side curtains, which may be constructed using a fabric and flexible fiberglass stays combination or a foam core and fabric combination, are typically mounted to the side members to extend at least partially across the shelter opening. When a vehicle is backed into the shelter, the inwardly facing edges of the seal members or side curtains deflect and sweep against the sides of the vehicle to form an environmental barrier or seal against the sides of the vehicle. In the event the off-center position of a vehicle results in the rear of the vehicle impacting a side member, the foam core or body of the side member is resiliently compressed. When the vehicle is pulled away from an impacted side member, the foam core of the side member causes the side member to substantially recover to its original condition or shape.

BRIEF DESCRIPTION OF THE DRAWINGS

FIG. 3 is a cross-sectional view taken along line 3-3 of FIG. 1.

FIG. 4 is a cross-sectional view taken along line 4-4 of FIG. 2

FIG. 5 is a cross-sectional view taken along line 5-5 of FIG. 1.

FIG. 6 is a cross-sectional view similar to FIG. 5 but with the example lateral sealing member in the activated configuration.

FIG. 7 is an enlarged view of section-7 in FIG. 5.

FIG. 8 is a cross-sectional view similar to FIG. 5 but showing another example lateral sealing member constructed in accordance with the teachings disclosed herein.

FIG. 9 is a cross-sectional view similar to FIG. 8 but with the example lateral sealing member shown in the activated configuration.

FIG. 10 is an enlarged view of section-10 in FIG. 8.

FIG. 17 is a cross-sectional view similar to FIG. 14 but showing the addition of an example channel seal constructed in accordance with the teachings disclosed herein.

FIG. 18 is a cross-sectional view similar to FIG. 17 but with the example lateral sealing member shown in the activated configuration.

FIG. 19 is an enlarged view of section-19 in FIG. 17.

FIG. 26 is a cross-sectional view similar to FIG. 5 but showing another example lateral sealing member constructed in accordance with the teachings disclosed herein.

FIG. 27 is a cross-sectional view similar to FIG. 26 but with the example lateral sealing member shown in the activated configuration.

FIG. 28 is an enlarged view of section-28 in FIG. 26.

FIG. 32 is a cross-sectional view similar to FIG. 5 but showing another example lateral sealing member constructed in accordance with the teachings disclosed herein.

FIG. 33 is a cross-sectional view similar to FIG. 32 but with the example lateral sealing member shown in the activated configuration.

FIG. 34 is an enlarged view of section-34 in FIG. 32.

DETAILED DESCRIPTION

Figure 1:
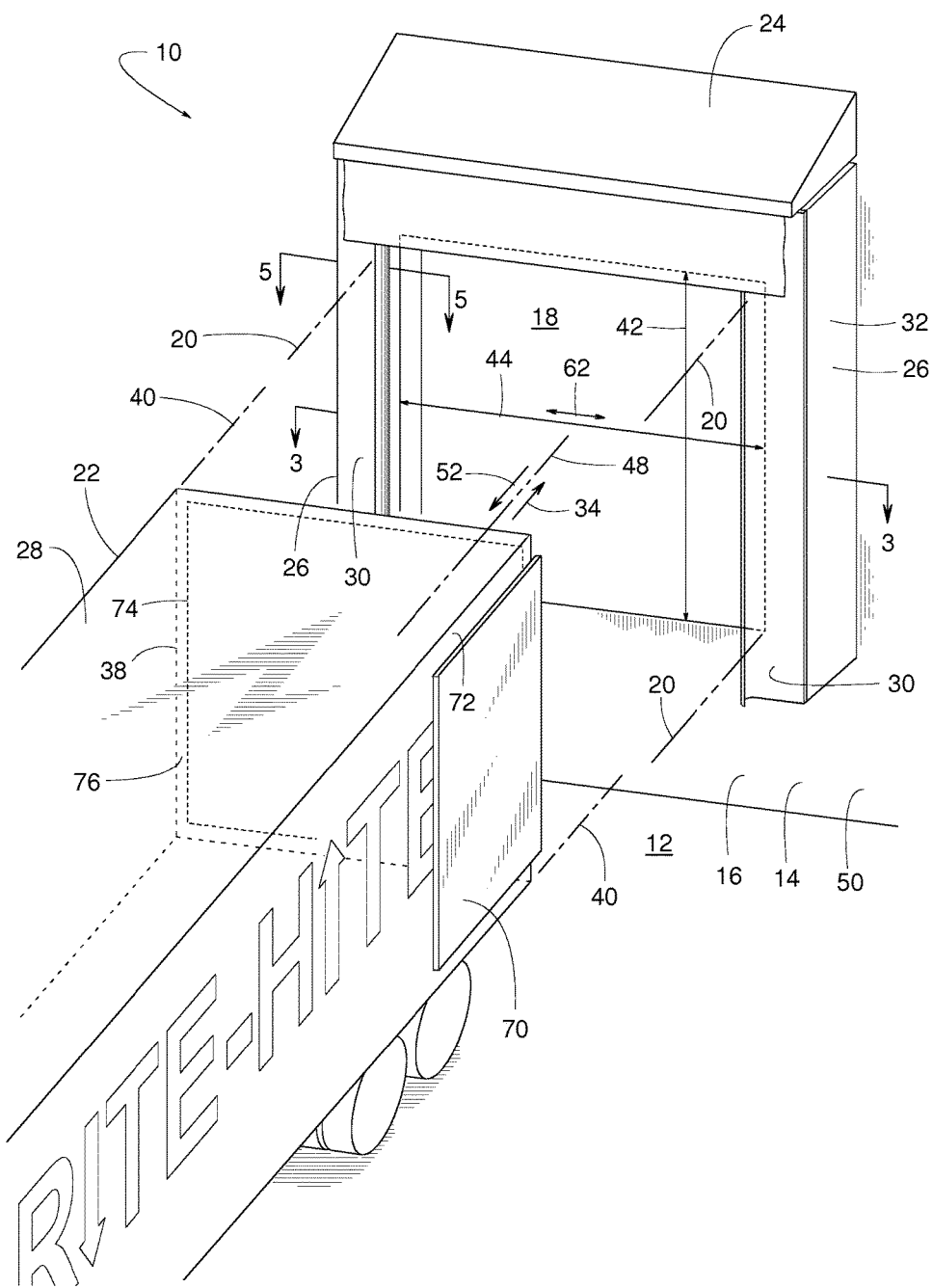
FIG. 1 is a perspective view of an example weather barrier with example lateral sealing members constructed in accordance with the teachings disclosed herein. A vehicle in the illustrated example is shown in a departed position, and the lateral sealing members are shown in a relaxed configuration.
Figure 2:
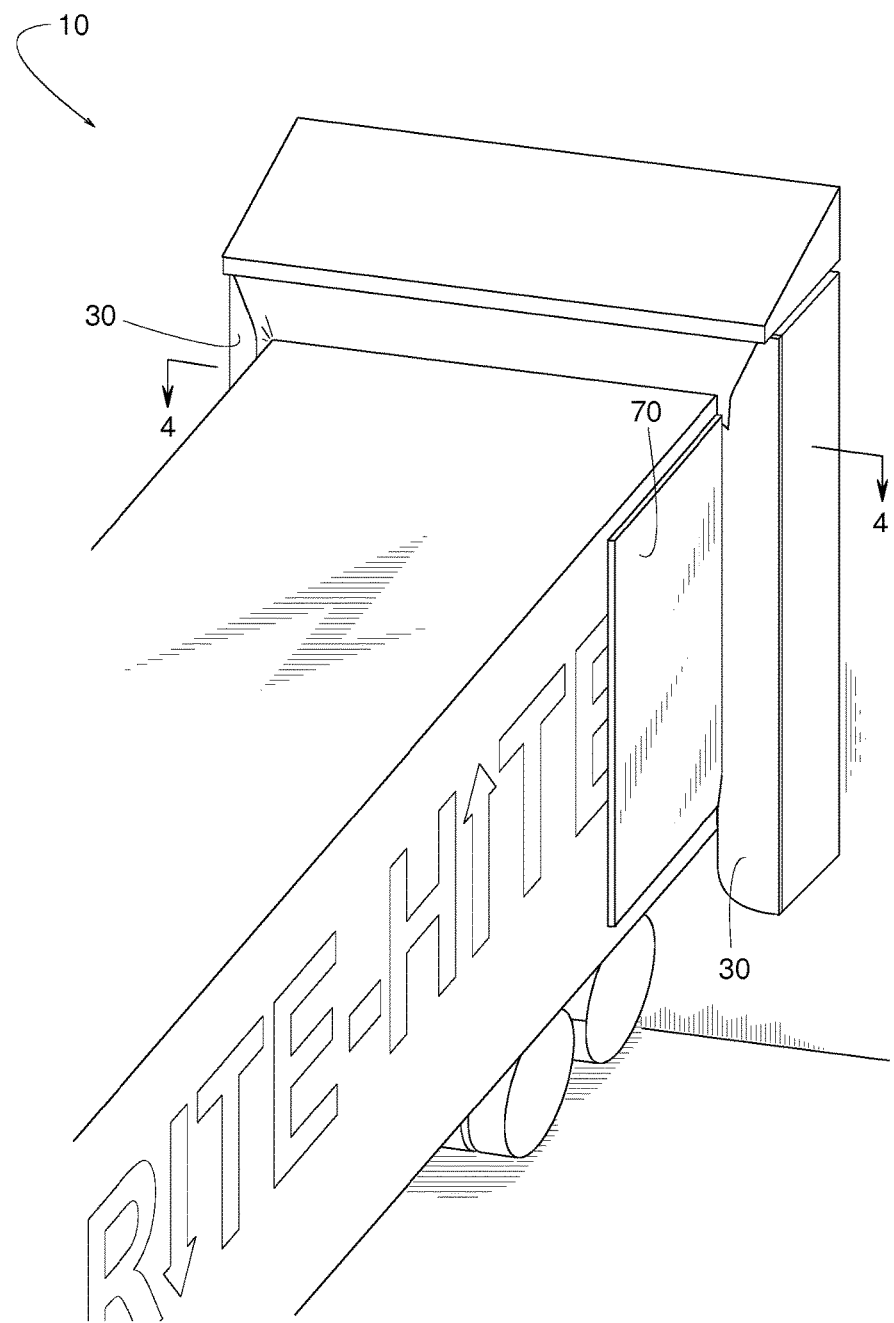
FIG. 2 is a perspective view of the example weather barrier of FIG. 1 showing the vehicle in a parked position and the lateral sealing members in an activated configuration.

Example lateral sealing members for use at vehicle loading docks are disclosed herein. An example sealing member disclosed herein may be employed to implement a header (e.g., positioned generally horizontally relative to a doorway) and/or a side seal (e.g., positioned generally vertically relative to a doorway). The example lateral sealing members disclosed herein include tip seals to enhance sealing between the lateral sealing members and a surface of a vehicle to be engaged by the tip seal and/or the lateral sealing members. For example, the lateral sealing members disclosed herein may include a deformable or flexible seal positioned adjacent an end of the lateral sealing member that is to engage a vehicle when the vehicle is parked at a loading dock at which the lateral sealing member is installed. In some examples, the example tip seals of the lateral sealing members disclosed herein increase a contact surface area to enhance sealing capabilities of the lateral sealing members. The tip seals disclosed herein may include a hollow chamber, a deformable air chamber, deformable brush bristles, a pivotal seal, a deformable foam, and/or any other seal. An example lateral sealing member disclosed herein may include a J-shaped cross-section or profile to provide a vertical channel that extends into a pathway of a vehicle to catch or engage a rear vertical edge of the vehicle as the vehicle engages the lateral sealing member. The example channel may cover a hinge gap between a hinged door panel of the vehicle and/or the rear edge of the vehicle. In some examples, the channel may include a tip seal to enhance or increase a sealing contact with the vehicle. In addition or alternatively, some examples lateral sealing members disclosed herein include a channel seal at a point of transition between the channel and a flatter section (e.g., an end attached to a side structure (e.g., an attached end) or a portion not forming the channel) of the lateral sealing member.

FIGS. 1-4 show various views of an example weather barrier 10 installed at a loading dock 12 of a building facility 14. The building 14 has a wall 16 with a doorway 18 that provides a cargo passageway 20 for transferring cargo between a vehicle 22 (e.g., truck, trailer, etc.) and the interior of the building 14. To help seal or shelter the area between the vehicle 22 and the wall 16, the weather barrier 10 includes a header 24 and two side members 26 adjacent (e.g., that line) a perimeter of doorway 18.

The header 24 is schematically illustrated to represent means for sealing against a roof 28 of the vehicle 22. Examples of the header 24 include, but are not limited to, a weighted curtain, a deflectable panel, a compressible pad, etc.

Each side member 26 includes an example of a lateral sealing member 30 (e.g., lateral sealing members 30a-m) attached to a side support member 32, which in turn is mounted to the wall 16 or to some other structure of the building 14. The side support member 32 is schematically illustrated to represent any structural means for supporting the lateral sealing member 30. Examples of the side support member 4 include, but are not limited to, a resiliently compressible foam block, a rigid panel, a semi-rigid panel, and/or various combinations thereof. In reaction to the vehicle 22 backing into the dock 12, the lateral sealing members 30 resiliently deflect rearward 34 and outward 36 to seal against rear vertical edges 38 and/or adjacent surfaces (e.g., a side surface) of the vehicle 22. FIGS. 5-41 illustrate various examples of the lateral sealing member 30 (e.g., the lateral sealing members 30a-m).

For spatial reference, the vehicle's travel path into dock 12 defines a vehicle pathway 40 leading to the doorway 18. The doorway 18 has a doorway height 42 extending in a generally vertical direction and a doorway width 44 extending in a generally lateral horizontal direction. The doorway height 42 and the doorway width 44 lie along and define a plane 46 and a line 48 perpendicular to the plane 46. The wall 16 has an exterior surface 50 facing in a forward direction 52 parallel to the line 48. The wall 16 defines the cargo passageway 20 passing through the doorway 18, where the passageway's height and width corresponds to the doorway's height 42 and width 44, respectively. The vehicle 22 is movable between a parked position (FIGS. 2 and 4) and a departed position (FIGS. 1 and 3). The vehicle 22 in the parked position is to place or position the weather barrier 10 and the lateral sealing member 30 in an activated configuration, as shown for example in FIGS. 2, 4, 6, 9, 12, 15, 18, 21, 24, 27, 30, 33, 36 and 39. The vehicle 22 in the departed position is to place or position the weather barrier 10 and lateral sealing member 30 in a relaxed configuration, as shown for example in FIGS. 1, 3, 5, 7, 8, 10, 11, 13, 14, 16, 17, 19, 20, 22, 23, 25, 26, 28, 29, 31, 32, 34, 35, 37, 38, 40 and 41. As can be seen in the figures, the lateral sealing member 30 extends farther into vehicle pathway 40 when lateral sealing member 30 is in the relaxed configuration (FIG. 3) than when the lateral sealing member 30 is in the activated configuration (FIG. 4).

In the example shown in FIGS. 5-7, a lateral sealing member 30a is vertically elongate and includes an end 54, a side panel 56, a channel 58 and a tip 60, each of which are vertically elongate. The tip 60 extends farther into vehicle pathway 40 when lateral sealing member 30a is in the relaxed configuration (FIG. 5) than when lateral sealing member 30a is in the activated configuration (FIG. 6). The end 54 of the lateral sealing member 30a (e.g., directly) connects, attaches or couples to the side support member 32 and is situated laterally beyond the cargo passageway 20 (e.g., outside a perimeter defining the cargo passageway 20). To form the channel 38 of the example lateral sealing member 30a, the example lateral sealing member 30a has a J-shaped end and/or a J-shaped cross-section or profile (e.g., when the cross-section is taken along a plane horizontal relative to ground or perpendicular relative to a vertical length of the lateral sealing member 30a). With reference to a horizontal direction 62 and the J-shaped horizontal cross-section (e.g., FIG. 5), the side panel 56 extends between the end 54 and the channel 58. The side panel 56 includes a transition 64 between the channel 58 and the end 54 to adjoin or couple the channel 38 and the side panel 56. Also with reference to horizontal direction 62, channel 58 extends between tip 60 and side panel 56.

The channel 58 defines a vertically elongate groove 66 that is sized to receive the rear vertical edge 38 of the vehicle 22. In some examples, the rear edge 38 is an area where a door hinge 68 of the vehicle 22 pivotally couples a rear door panel 70 of the vehicle 12 to a sidewall 72 of the vehicle 22. In some examples, the sidewall 72 includes a rear flange 76 or doorframe surrounding a rear door opening 74 of the vehicle 22. In the illustrated examples, the channel 58 bridges a hinge gap 78 between the door panel 70 and the sidewall 72. To enhance and/or increase a sealing contact or area between the lateral sealing member 30a and the vehicle 22, the lateral sealing member 30a includes a tip seal 80 proximate the tip 60. The tip seal 80 of the illustrated example is resiliently compliant (e.g., flexible and/or compressible) and extends into the groove 66.

In the example shown in FIGS. 5-7, the side panel 56, the channel 58 and the tip 60 include a core 82 made of a flexible material to provide the lateral sealing member 30a with strength, durability and/or resilience. Examples of the core materials include, but are not limited to, 1/16"-1/8" thick UHMW (ultra high molecular weight polyethylene) or other plastics and/or materials of other thicknesses, a spring steel, and/or various combinations of materials. The core 82 can be of any suitable design, examples of which include, but are not limited to, a unitary formed piece, an assembly of pieces, a skeletal framework, etc. In some examples, particularly those where the core 82 is a skeletal framework, the core 82 may be encased within a pliable covering 84 (e.g., covering 84a-g) to prevent airflow though the core 82. Example materials of the covering 84 include, but are not limited to, 22-once or 44-once vinyl coated fabric, nylon fabric, polyester fabric, non-fabric plastic sheeting, etc. The relative flexibility of the covering 84 enables it to conform to the shape of core 82.

In this example, the tip seal 80 includes a bowed strip of material 86 having vertical edges 88 sewn, bonded and/or otherwise attached to the covering 84a and/or to the core 82. The strip 86 is bowed to provide or create an air chamber 90 between the strip 86 and the covering 84a. In the illustrated example, the seal 80 is hollow. The air chamber 90 provides the tip seal 80 with resilient compressibility to sealing conform (as shown in FIG. 6) to an interior surface 92 of the sidewall 72 and/or to other rear portions of the vehicle 22. In some examples, the strip 86 is made of the same material as the covering 84. For enhanced sealing, some examples of the tip seal 80 are more flexible than the core 82 and the channel 58.

In another example, shown in FIGS. 8-10, a lateral sealing member 30b is similar to the lateral sealing member 30a but has an alternate tip seal. The lateral sealing member 30b has a tip seal 94 that is formed by drawing together or folding a section 96 of the covering 84b such that the section 96 bulges to create an air chamber 98 between the section 96 and the core 82. To form the air chamber 98, sides 100 of the section 96 are sewn, bonded and/or otherwise attached to the core 82 to create the tip seal 94 as an integral extension of the covering 84b.

Figure 11:
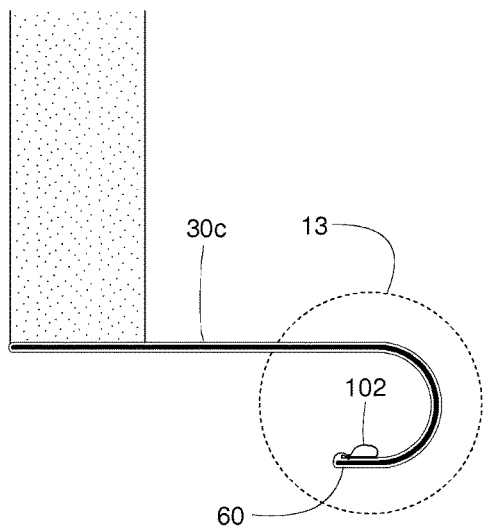
FIG. 11 is a cross-sectional view similar to FIG. 5 but showing another example lateral sealing member constructed in accordance with the teachings disclosed herein.
Figure 12:
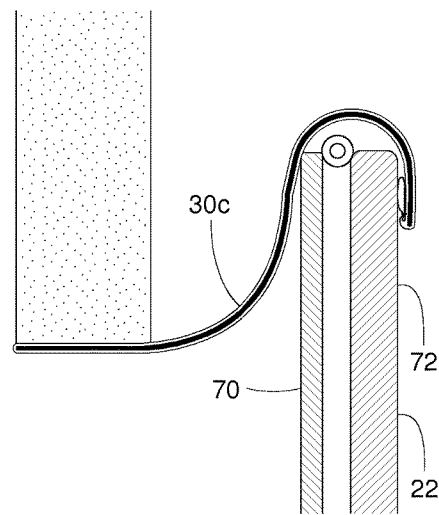
FIG. 12 is a cross-sectional view similar to FIG. 11 but with the example lateral sealing member shown in the activated configuration.
Figure 13:
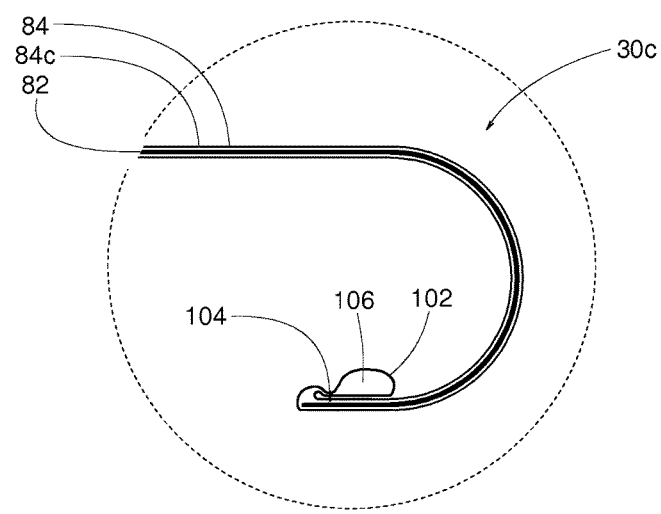
FIG. 13 is an enlarged view of section-13 in FIG. 11.

In the example shown in FIGS. 11-13, a lateral sealing member 30c is similar to the lateral sealing members 30a and 30b but has a tip seal 102 instead of the tip seals 80 or 94. The tip seal 102 is formed by folding back a double layer of the covering 84c and sewing, bonding and/or otherwise fastening that section, near a base 104 of the fold, to the core 82 and/or to another section of the covering 84c. The tip seal 102 is thus an integral extension of the covering 84c and is hollow to define an air chamber 106 that runs vertically along the tip 60.

Figure 14:
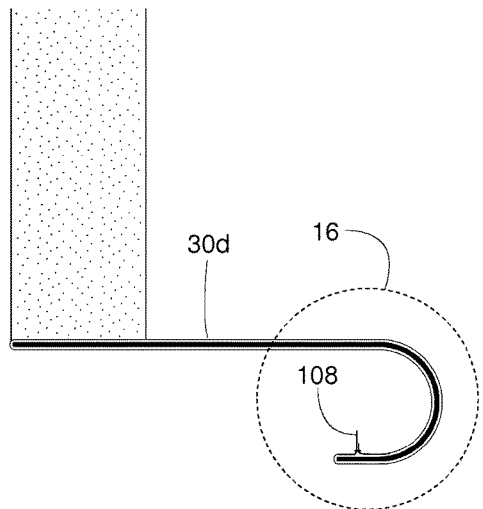
FIG. 14 is a cross-sectional view similar to FIG. 5 but showing another example lateral sealing member constructed in accordance with the teachings disclosed herein.
Figure 15:
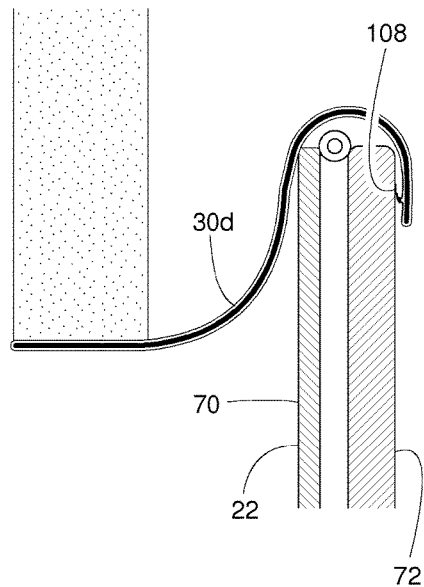
FIG. 15 is a cross-sectional view similar to FIG. 14 but with the example lateral sealing member shown in the activated configuration.
Figure 16:
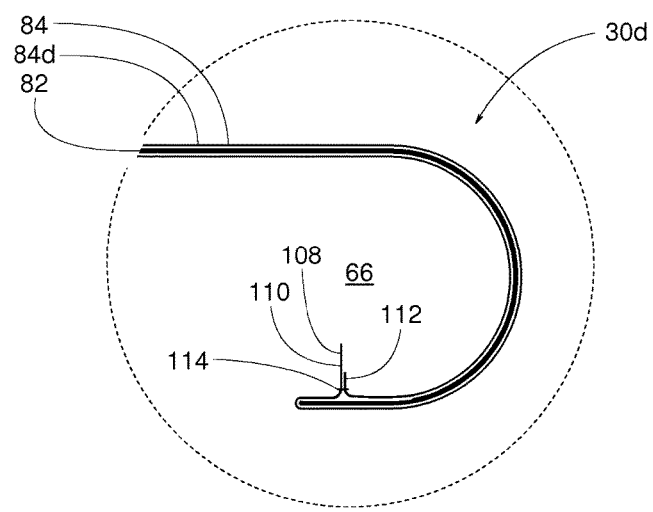
FIG. 16 is an enlarged view of section-10 in FIG. 14.

In the example shown in FIGS. 14-16, the lateral sealing member 30d is similar to lateral sealing members 30a-c but has yet another alternate tip seal. The lateral sealing member 30d has a tip seal 108 that is formed by cutting, bending and/or refastening the resulting lips 110 and 112 at a base 114 of where they are folded. The lips 110 and/or 112 then protrude into the groove 66. In reaction to the vehicle 22 backing into the dock 12, the lip seal 108 resiliently deflects and sealingly engages the sidewall 72 of the vehicle 22, as shown in FIG. 15.

In addition or alternatively to the tip seal 108, a lateral sealing member 30e includes a channel seal 116 to seal against an inner surface 118 of the rear door panel 70. The channel seal 116 can be used along with any other tip seal disclosed herein and/or used on a lateral sealing member 30 without a tip seal. In the example illustrated in FIGS. 17-19, the channel seal 116 is similar to the tip seal 80 shown in FIGS. 5-7. The channel seal 116 has a bowed strip of material 120 with vertical edges 122 sewn, bonded and/or otherwise attached to the covering 84e and/or to the core 82. The strip 120 is bowed to create an air chamber 124 between the strip 120 and the covering 84e, thus this example of the channel seal 116 is hollow. The air chamber 124 provides the channel seal 116 with resilient compressibility to sealingly conform (as shown in FIG. 18) to the inner surface 118 and/or to other rear portions or surfaces of the vehicle 22. In some examples, the strip 120 is made of the same material as the covering 84. For enhanced sealing, some examples of the channel seal 116 are more flexible than the core 82 and/or the channel 58.

To provide bidirectional sealing, in the example shown in FIGS. 17-19, the channel seal 116 protrudes generally from point of the transition 64 toward the tip seal 108. Also, the tip seal 108 protrudes from the lateral sealing member 30e toward the doorway 18 when the lateral sealing member 30e is in the relaxed configuration (FIG. 17), and the channel seal 116 protrudes from the lateral sealing member 30e away from the doorway 18 when the lateral sealing member 30e is in the relaxed configuration (FIG. 17). In addition, the tip seal 108 protrudes from the lateral sealing member 30e outwardly away from the vehicle pathway 40 when the lateral sealing member 30e is in the activated configuration (FIG. 18), and the channel seal 116 protrudes from the lateral sealing member 30e inwardly toward the vehicle pathway 40 when the lateral sealing member 30e is in the activated configuration (FIG. 18).

Figure 20:
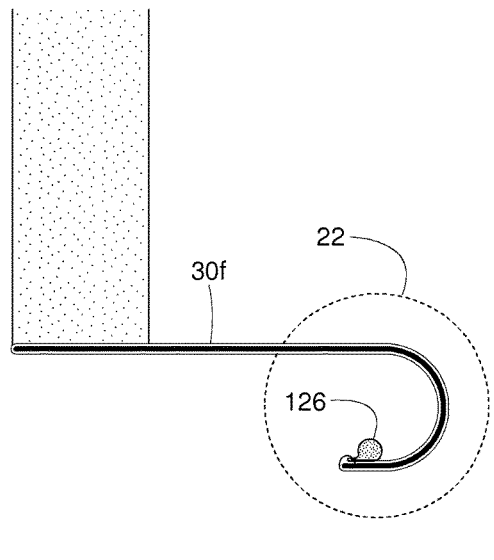
FIG. 20 is a cross-sectional view similar to FIG. 11 but showing another example lateral sealing member constructed in accordance with the teachings disclosed herein.
Figure 21:
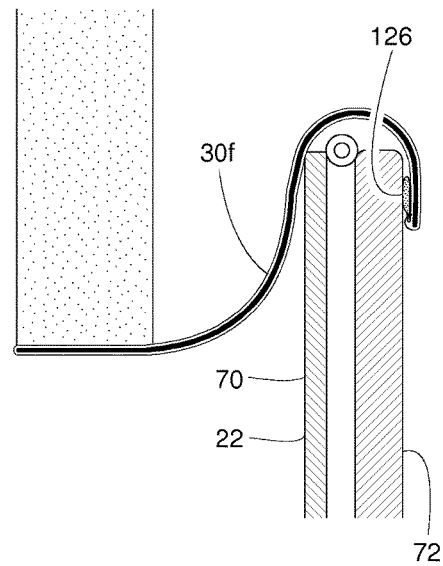
FIG. 21 is a cross-sectional view similar to FIG. 20 but with the example lateral sealing member shown in the activated configuration.
Figure 22:
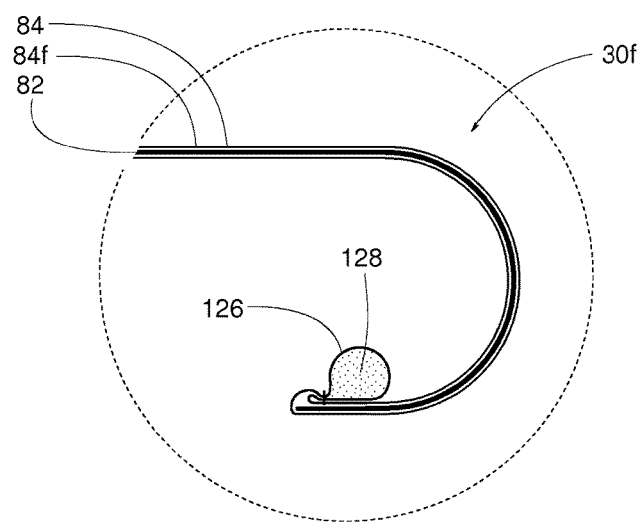
FIG. 22 is an enlarged view of section-22 in FIG. 20.

Any of the hollow seals (e.g., 90, 98, 106, 124) disclosed herein can be filled with resiliently compressible foam to increase a sealing force against the vehicle 22. FIGS. 20-22, for example, show a lateral sealing member 30f with a tip seal 126 that is similar to the tip seal 102 of FIGS. 11-13, but with foam 128 installed or positioned within the air chamber 106.

Figure 23:
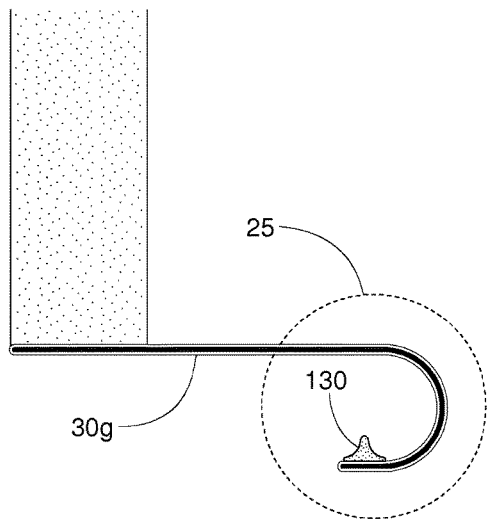
FIG. 23 is a cross-sectional view similar to FIG. 5 but showing another example lateral sealing member constructed in accordance with the teachings disclosed herein.
Figure 24:
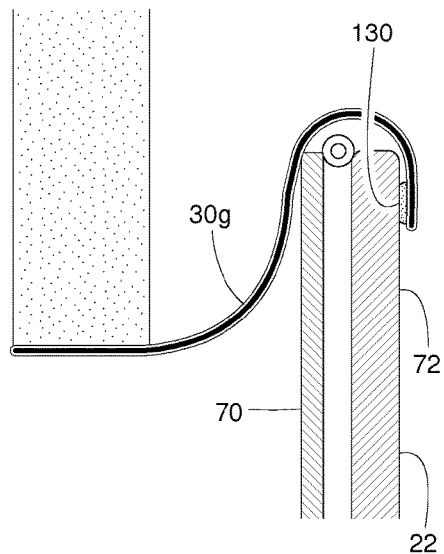
FIG. 24 is a cross-sectional view similar to FIG. 23 but with the example lateral sealing member shown in the activated configuration.
Figure 25:
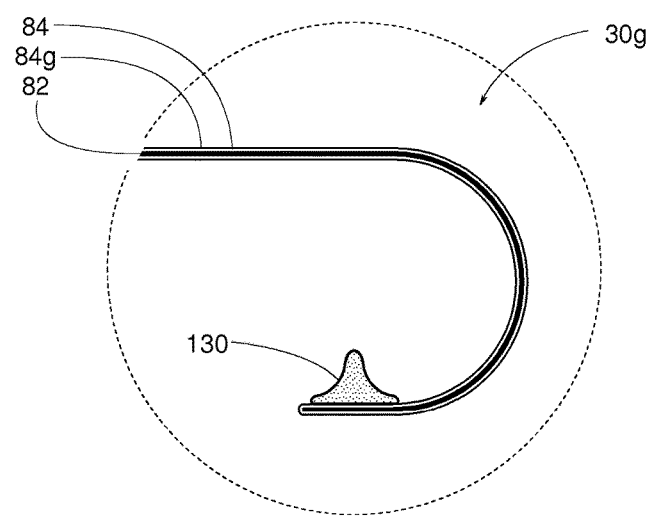
FIG. 25 is an enlarged view of section-25 in FIG. 23.
Figure 29:
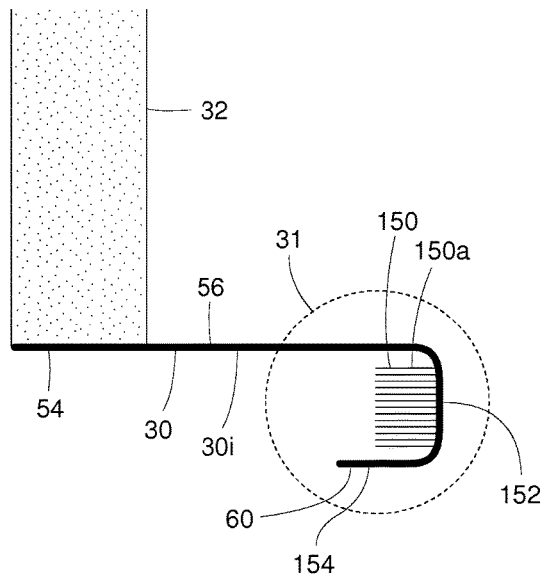
FIG. 29 is a cross-sectional view similar to FIG. 5 but showing another example lateral sealing member constructed in accordance with the teachings disclosed herein.

FIGS. 23-25 show an example lateral sealing member 30g with a tip seal 130 made of an extruded or injection molded sponge rubber, such as EPDM (ethylene propylene diene monomer).

In the example shown in FIGS. 26-28, a lateral sealing member 30h includes an integral living hinge 132 that seamlessly connects a tip seal 134 to the core 82. The hinge 132 causes the tip seal 134 to pivot or move relative to the core 82 and/or the lateral sealing member 30h. In some examples, the hinge 132 seamlessly connects the tip seal 134 to the channel 58 of the core 82. In the illustrated example, the hinge 132 is interposed between an inner sealing edge 136 and an outer sealing edge 138 of the tip seal 134. In reaction to vehicle 22 backing into the lateral sealing member 30h, the vehicle 22 engaging the inner sealing member 136 tilts the tip seal 134 about the hinge 132 to force the outer sealing edge 138 sealingly against the vehicle 22, as shown in FIG. 27. In some examples of the lateral sealing member 30h, the covering 84 is omitted.

Figure 30:
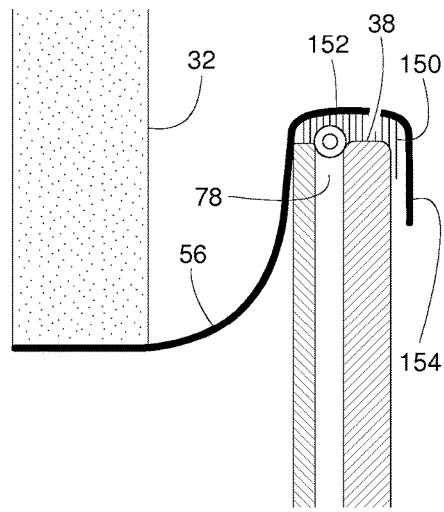
FIG. 30 is a cross-sectional view similar to FIG. 29 but with the example lateral sealing member shown in the activated configuration.
Figure 31:
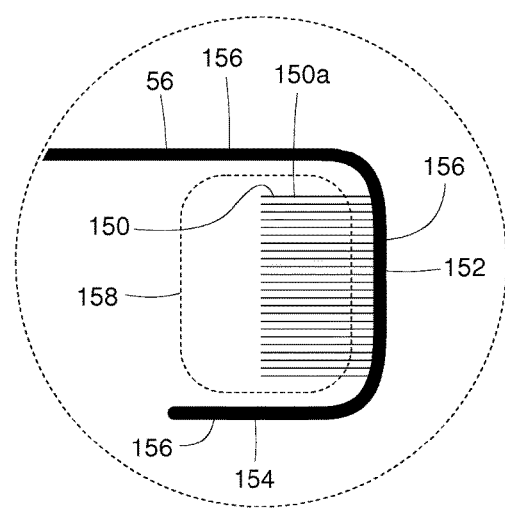
FIG. 31 is an enlarged view of section-31 in FIG. 29.
Figure 41:
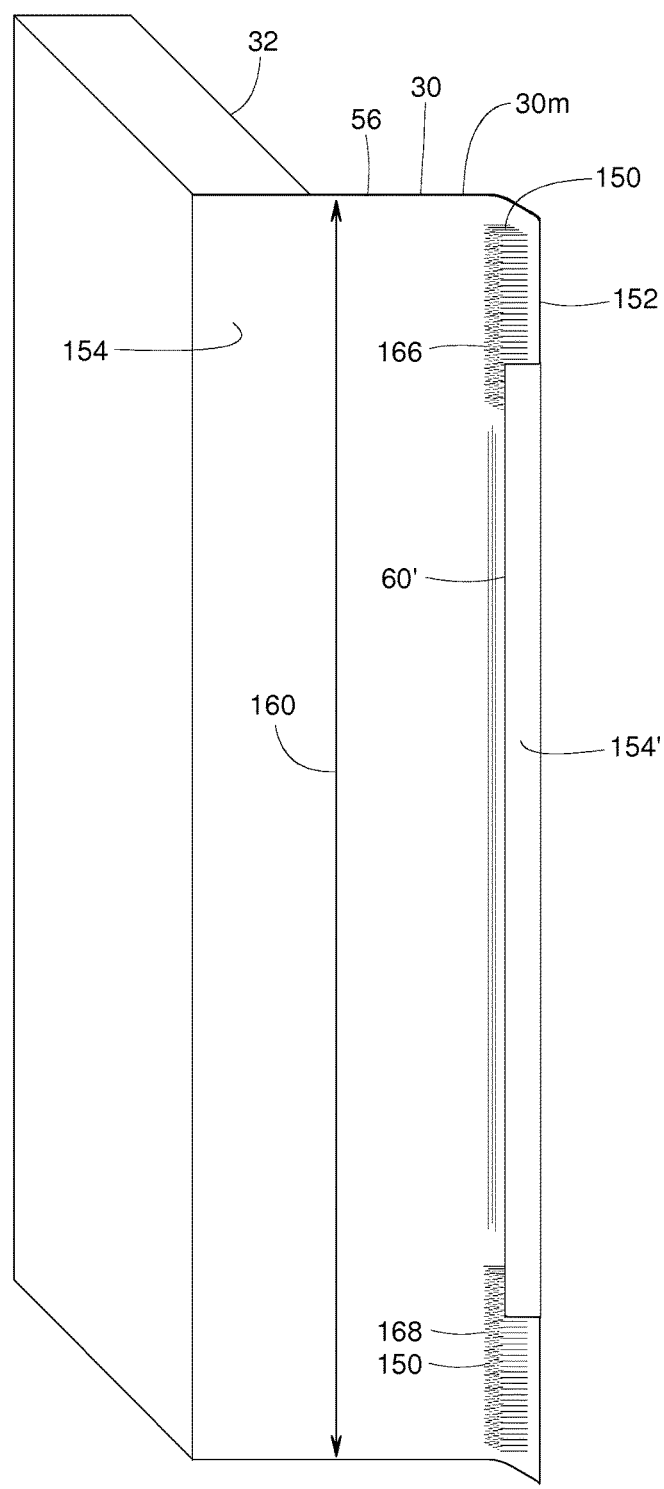
FIG. 41 is a perspective view of another example lateral sealing member constructed in accordance with the teachings disclosed herein.

A brush seal with bristles 150 (e.g., bristles 150a-f) can be used as an alternative to any of the tip seals shown in FIGS. 1-28. The brush seal can be attached to a lateral sealing member 30 by any suitable means, examples of which include, but are not limited to, rivets, self-tapping screws, hook-and-loop fasteners, kedar strips, sewing, adhesive, ultrasonic welding, etc. In the example shown in FIGS. 29-31, a lateral sealing member 30i includes an attached end 54, a side panel 56, a rear panel 152, a tip panel 154, and a tip 60; all of which are vertically elongate. The panels 56, 152 and 154 create a channel 156 that defines a groove 158 in the lateral sealing member 30i. In this example, a plurality of bristles 150a is attached to the rear panel 152. The bristles 150a provide a compliant seal that covers hinge gap 78 and readily conforms to the vehicle's rear vertical edges 38, as shown in FIG. 30. In some examples, the bristles 150a are distributed evenly over substantially the entire vertical length of the lateral sealing member 30i. In other examples, as shown in FIG. 41, the bristles 150 cover appreciably less than the lateral sealing member's overall vertical length 160 for reasons that will be explained later.

In addition or alternatively, an example lateral sealing member 30j includes a plurality of bristles 150b attached to the tip panel 154, as shown in FIGS. 32-34. At this mounting location, the bristles 150b provide an effective seal along the vehicle's rear sidewall 72, as shown in FIG. 33.

Figure 35:
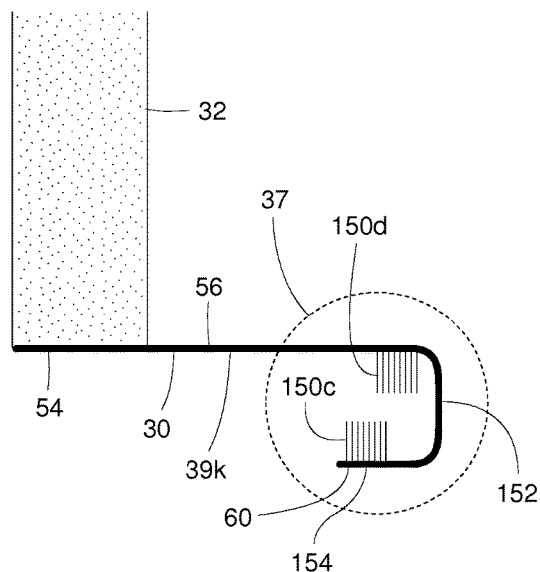
FIG. 35 is a cross-sectional view similar to FIG. 5 but showing another example lateral sealing member constructed in accordance with the teachings disclosed herein.
Figure 36:
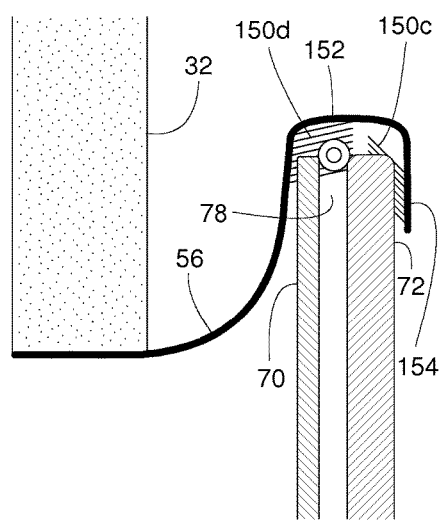
FIG. 36 is a cross-sectional view similar to FIG. 35 but with the example lateral sealing member shown in the activated configuration.
Figure 37:
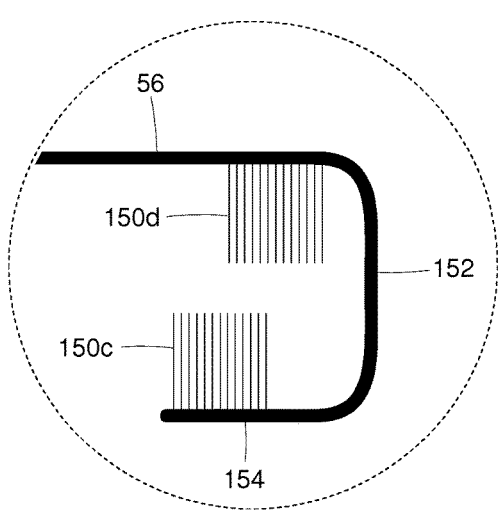
FIG. 37 is an enlarged view of section-37 in FIG. 35.

In addition or alternatively, an example lateral sealing member 30k includes a plurality of bristles 150c attached to the tip panel 154 and a second plurality of bristles 150d attached to the side panel 56, as shown in FIGS. 35-37. In this example, the bristles 150c provide an effective seal along the vehicle's rear sidewall 72, and the bristles 150d provide an effective seal along the vehicle's rear door panel 70, as shown in FIG. 36. In some examples, the bristles 150c and/or 150d further seal across hinge gap 78.

Figure 38:
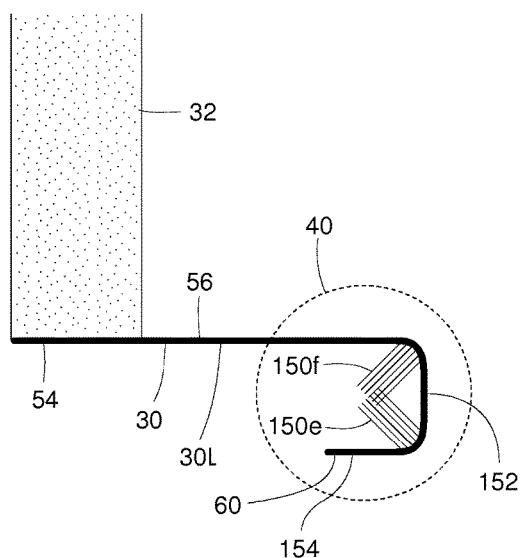
FIG. 38 is a cross-sectional view similar to FIG. 5 but showing another example lateral sealing member constructed in accordance with the teachings disclosed herein.
Figure 39:
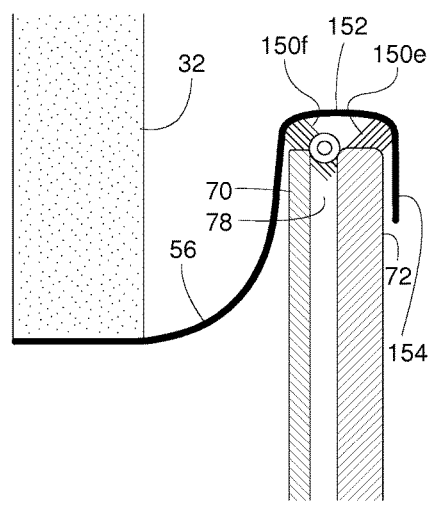
FIG. 39 is a cross-sectional view similar to FIG. 38 but with the example lateral sealing member shown in the activated configuration.
Figure 40:
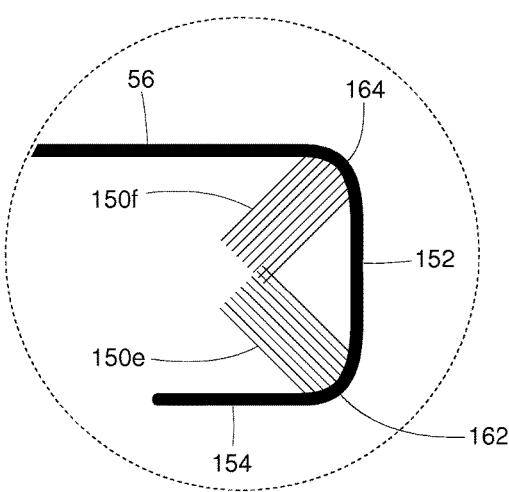
FIG. 40 is an enlarged view of section-40 in FIG. 38.

In addition or alternatively, an example lateral sealing member 30l includes a plurality of bristles 150e attached to an interface 162 (e.g., an inside corner) of the rear panel 152 and the tip panel 154, and/or a plurality of bristles 150f attached to an interface 164 of the rear panel 152 and the side panel 56, as shown in FIGS. 38-40. In this example, the bristles 150e and/or 150f provide an effective seal along the vehicle's rear sidewall 72 and/or along the vehicle's rear door panel 70, as shown in FIG. 39. In some examples, the bristles 150e and/or 150f further seal across hinge gap 78.

Referring again to FIG. 41, an example lateral sealing member 30m includes an attached end 54, the side panel 56, the rear panel 152, a tip panel 154', and a tip 60'; all of which are vertically elongate. In this example, the tip panel 154' is vertically shorter than the rear panel 152. The relatively short length provides the tip panel 154' with vertical clearance to reach into the vehicle's rear door opening 74 without interference from the rear door opening's upper and lower edges. To provide sealing at the door opening's upper and lower edges, the brush segments 166 and 168 each have a plurality of bristles 150 that are installed or coupled at the upper and lower ends of the lateral sealing member 30*m*. The distribution of bristles 150 (e.g., bristles 150*a-f*) covering less than the lateral sealing member's overall vertical length 160, allows use any other desired sealing means between the brush segments 166 and 168.

For further clarification, arrow 146 of FIG. 3 represents installing a lateral sealing member at the loading dock 12 proximate the doorway 18. Arrows 142 of FIG. 3 represents opening the rear door panel 70 of the vehicle 22 such that the normally inner surface 118 of the rear door panel 70 faces away from the interior surface 92 of the vehicle 22. The arrows 142 also represent creating a hinge gap 38 by opening the rear door panel 70 of the vehicle 22. The arrow 144 of FIG. 3 represents backing the vehicle 22 along the vehicle pathway 40 toward the doorway 18 of the loading dock 12. The arrows 36 of FIG. 3 and the arrow 148 of FIG. 6 represent the vehicle 22 deflecting the lateral sealing member 30 laterally outward in a direction away from the vehicle pathway 40. FIGS. 4, 6, 9, 12, 15, 18, 21, 24, 27, 30, 33, 36 and 39 illustrate a lateral sealing member 30 bridging or covering the hinge gap 38. FIGS. 6, 9, 12, 15, 18, 21, 24, 27, 33 and 36 illustrate resiliently distorting a tip seal (e.g., the tip seals 80, 94, 102, 108, 126 and 134) between the lateral sealing member 30 and at least one of the rear portion or the interior surface 92 of the vehicle 22. FIGS. 18 and 36 shows resiliently distorting a channel seal (e.g., the channel seal 116 or the tip seal 154) between the lateral sealing member 30 and the normally inner surface 118 of the rear door panel 70. In addition or alternatively, all of the example lateral sealing members 30 disclosed herein can be turned sideways and used as a header for sealing against the vehicle's roof. In other words, the example header 24 may be implemented with the example lateral sealing members 30 and/or the tip seals disclosed herein.

At least some of the aforementioned examples include one or more features and/or benefits including, but not limited to, the following:

In some examples,

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A weather barrier comprising:
a lateral sealing member being vertically elongate, the lateral sealing member having a J-shaped cross-section extending between an attached end and a tip of the lateral sealing member, the lateral sealing member defining a groove along the tip, the lateral sealing member including a core within a covering, the core being stiffer than the covering, both the core and the covering being vertically elongate, and both the core and covering extending between the attached end and the tip, the lateral sealing member being movable between an activated configuration and a relaxed configuration, the tip to extend farther into a vehicle pathway when the lateral sealing member is in the relaxed configuration than when the lateral sealing member is in the activated configuration; and
a tip seal provided along the tip of the lateral sealing member, the tip seal to protrude in the groove, wherein the covering and the tip seal are more flexible than the core.

2. A weather barrier comprising:
a lateral sealing member being vertically elongate, the lateral sealing member having a J-shaped cross-section extending between an attached end and a tip of the lateral sealing member, the lateral sealing member defining a groove along the tip, the lateral sealing member including a core within a covering, the core being stiffer than the covering, both the core and the covering being vertically elongate, and both the core and covering extending between the attached end and the tip, the lateral sealing member being movable between an activated configuration and a relaxed configuration, the tip to extend farther into a vehicle pathway when the lateral sealing member is in the relaxed configuration than when the lateral sealing member is in the activated configuration; and
a tip seal provided along the tip of the lateral sealing member, the tip seal to protrude in the groove, wherein the tip seal defines an air chamber between the core and the covering.

3. The weather barrier of claim 2, further comprising a foam piece disposed within the air chamber.

4. A weather barrier comprising:
a lateral sealing member being vertically elongate, the lateral sealing member having a J-shaped cross-section extending between an attached end and a tip of the lateral sealing member, the lateral sealing member defining a groove along the tip, the lateral sealing member being movable between an activated configuration and a relaxed configuration, the tip to extend farther into a vehicle pathway when the lateral sealing member is in the relaxed configuration than when the lateral sealing member is in the activated configuration;
a tip seal provided along the tip of the lateral sealing member, the tip seal to protrude in the groove; and
a channel seal on the lateral sealing member, the tip seal protruding from the lateral sealing member toward a doorway of a loading dock when the lateral sealing member is in the relaxed configuration, the channel seal protruding from the lateral sealing member away from the doorway when the lateral sealing member is in the relaxed configuration.

5. A weather barrier comprising:
a lateral sealing member being vertically elongate, the lateral sealing member having a J-shaped cross-section extending between an attached end and a tip of the lateral sealing member, the lateral sealing member defining a groove along the tip, the lateral sealing member being movable between an activated configuration and a relaxed configuration, the tip to extend farther into a vehicle pathway when the lateral sealing member is in the relaxed configuration than when the lateral sealing member is in the activated configuration;
a tip seal provided along the tip of the lateral sealing member, the tip seal to protrude in the groove; and
a channel seal on the lateral sealing member, the tip seal protruding from the lateral sealing member outwardly away from the vehicle pathway when the lateral sealing member is in the activated configuration, the channel seal protruding from the lateral sealing member inwardly toward the vehicle pathway when the lateral sealing member is in the activated configuration.

6. A weather barrier comprising:
a lateral sealing member being vertically elongate, the lateral sealing member having a J-shaped cross-section extending between an attached end and a tip of the lateral sealing member, the lateral sealing member defining a groove along the tip, the lateral sealing member being movable between an activated configuration and a relaxed configuration, the tip to extend farther into a vehicle pathway when the lateral sealing member is in the relaxed configuration than when the lateral sealing member is in the activated configuration; and a tip seal provided along the tip of the lateral sealing member, the tip seal to protrude in the groove, the lateral sealing member including a hinge that supports a weight of the tip seal.

7. The weather barrier of claim 6, wherein the tip seal includes an outer sealing edge and an inner sealing edge, the hinge being interposed between the outer sealing edge and the inner sealing edge.

8. The weather barrier of claim 7, wherein the tip seal is an integral extension of the lateral sealing member by virtue of the hinge being a seamless living hinge.

9. The weather barrier of claim 6, wherein the lateral sealing member includes a core within a covering, the core being stiffer than the covering, both the core and the covering being vertically elongate, and both the core and covering extending between the attached end and the tip.

10. The weather barrier of claim 6, wherein the tip seal includes a plurality of bristles.

11. A weather barrier for at least partially sealing or sheltering a vehicle parked at a loading dock of a building that has a doorway in a wall, the doorway defining a plane and a line that is perpendicular to the plane, the doorway having a doorway height and a doorway width lying along the plane, the doorway height extending in a vertical direction, the doorway width extending in a lateral direction, the wall having an exterior surface facing in a forward direction with the forward direction being parallel to the line, the forward direction and the lateral direction being in a horizontal direction, the wall defining a cargo passageway passing through the doorway and projecting in the forward direction, the cargo passageway having a passageway height and a passageway width corresponding to the doorway height and the doorway width respectively, the vehicle having selectively a parked position and a departed position, the vehicle in the parked position being in front of the doorway and in engagement with the weather barrier, the vehicle in the departed position being separated from the weather barrier, the weather barrier being in an activated configuration when the vehicle is in the parked position, the weather barrier being in a relaxed configuration when the vehicle is in the departed position, the weather barrier comprising:

a lateral sealing member being vertically elongate, the lateral sealing member having an attached end, a side panel, a channel and a tip, each of the attached end, the side panel, the channel and the tip being vertically elongate, the attached end being mounted laterally beyond the cargo passageway, the side panel extending between the channel and the attached end with reference to the horizontal direction, the side panel adjoining the channel at a point of transition between the channel and the side panel, the channel extending between the tip and the side panel with reference to the horizontal direction, the channel defining a groove that is vertically elongate, the side panel extending farther into the cargo passageway when the weather barrier is in the relaxed configuration than when the weather barrier is in the activated configuration; and a tip seal proximate the tip of the lateral sealing member, the tip seal being vertically elongate, the tip seal protruding horizontally into the groove.

12. The weather barrier of claim 11, wherein the tip seal protrudes horizontally from the tip toward the point of transition between the channel and the side panel.

13. The weather barrier of claim 11, wherein the tip seal is more flexible than the channel.

14. The weather barrier of claim 11, wherein the tip seal includes a plurality of bristles.

15. The weather barrier of claim 11, wherein the lateral sealing member includes a core within a covering, the core being stiffer than the covering, the core and covering being vertically elongate, and the core and covering extending between the attached end and the tip.

16. The weather barrier of claim 15, wherein the core is a unitary piece extending seamlessly from the side panel to the tip.

17. The weather barrier of claim 11, wherein the tip seal is hollow.

18. The weather barrier of claim 11, further comprising a channel seal protruding from the point of transition toward the tip seal.

19. The weather barrier of claim 18, wherein the channel seal includes a plurality of bristles.

20. The weather barrier of claim 11, further comprising a channel seal protruding in the forward direction from the side panel when the weather barrier is in the relaxed configuration.

21. The weather barrier of claim 20, wherein the channel seal includes a plurality of bristles.

22. The weather barrier of claim 20, wherein the tip seal and the channel seal include a plurality of bristles.

23. The weather barrier of claim 20, wherein the channel seal is hollow.

24. The weather barrier of claim 20, wherein the lateral sealing member includes a core within a covering, the core being stiffer than the covering, the core and the covering being vertically elongate, the core and the covering extending between the side panel and the tip, and the channel seal being more flexible than the core.

25. The weather barrier of claim 20, wherein the lateral sealing member includes a core within a covering, the core being stiffer than the covering, the core and the covering being vertically elongate, the core and the covering extending between the side panel and the tip, and the channel seal defines an air chamber between the core and the covering.

26. The weather barrier of claim 25, further comprising a foam piece disposed within the air chamber.

27. The weather barrier of claim 11, further comprising a hinge to connect the tip seal and the channel.

28. The weather barrier of claim 27, wherein the tip seal includes an outer sealing edge and an inner sealing edge, the hinge being interposed between the outer sealing edge and the inner sealing edge.

29. The weather barrier of claim 28, wherein the hinge seamlessly joins the channel to the outer sealing edge and the inner sealing edge.

30. The weather barrier of claim 11, wherein the tip seal includes a foam piece and the lateral sealing member includes a core within a covering, the core being stiffer than the covering, the core and the covering being vertically elongate, the core and the covering extending between the side panel and the tip, and the foam piece being interposed between the core and the covering.

31. The weather barrier of claim 11, wherein the lateral sealing member includes a core within a covering, the core being stiffer than the covering, the core and the covering being vertically elongate, the core and covering extending between the side panel and the tip, and the tip seal defines an air chamber between the core and the covering.

32. A weather barrier to at least partially seal or shelter a vehicle parked at a loading dock of a building that has a doorway in a wall, the doorway defining a plane and a line that is perpendicular to the plane, the doorway having a doorway height and a doorway width lying along the plane, the doorway height extending in a vertical direction, the doorway width extending in a lateral direction, the wall having an exterior surface facing in a forward direction with the forward direction being parallel to the line, the forward direction and the lateral direction being in a horizontal direction, the wall defining a cargo passageway passing through the doorway and projecting in the forward direction, the cargo passageway having a passageway height and a passageway width corresponding to the doorway height and the doorway width respectively, the vehicle having selectively a parked position and a departed position, the vehicle in the parked position being in front of the doorway and engaging the weather barrier, the vehicle in the departed position being separated from the weather barrier, the weather barrier being in an activated configuration when the vehicle is in the parked position, the weather barrier being in a relaxed configuration when the vehicle is in the departed position, the weather barrier comprising:
 a lateral sealing member being vertically elongate, the lateral sealing member including an attached end, a side panel, a rear panel, a tip panel, and a tip, the attached end being mounted laterally beyond the cargo passageway, the side panel extending between the attached end and the rear panel with reference to the horizontal direction, the rear panel extending between the side panel and the tip panel with reference to the horizontal direction, the tip panel extending between the rear panel and the tip with reference to the horizontal direction, the side panel extending farther into the cargo passageway when the weather barrier is in the relaxed configuration than when the weather barrier is in the activated configuration;
 a groove being defined by the side panel, the rear panel and the tip panel, the groove being vertically elongate; and
 a plurality of bristles attached to at least one of the side panel, the rear panel or the tip panel, the plurality of bristles to extend into the groove.

33. The weather barrier of claim 32, wherein the plurality of bristles is attached to the side panel and extends toward the tip panel.

34. The weather barrier of claim 32, wherein the plurality of bristles is attached to the tip panel and extends toward the side panel.

35. The weather barrier of claim 32, wherein the plurality of bristles are attached to the rear panel.

36. The weather barrier of claim 32, wherein the rear panel and the tip panel include an interface where the rear panel adjoins the tip panel, and the plurality of bristles are attached to the interface.

37. The weather barrier of claim 32, wherein the rear panel and the side panel include an interface where the rear panel adjoins the side panel, and the plurality of bristles are attached to the interface.

38. The weather barrier of claim 32, wherein the plurality of bristles covers appreciably less than an overall vertical length of the lateral sealing member.

39. A weather barrier comprising:
 a lateral seal being vertically elongate, the lateral seal including a side panel and an end extending from the side panel, the end having a J-shaped cross-section defining a channel between the side panel and a tip of the end of the lateral seal, the lateral seal being movable between an activated configuration and a relaxed configuration, the tip to extend farther into a vehicle pathway when the lateral seal is in the relaxed configuration than when the lateral seal is in the activated configuration; and
 a channel seal positioned on a non-curved transition portion between the side panel and a curved portion of the end of the lateral seal, the channel seal protruding in a forward direction toward an inner surface of the tip of the lateral seal when the weather barrier is in the relaxed configuration.

40. The weather barrier of claim 39, wherein the channel seal is positioned at a point of transition between the channel and the end of the lateral seal.

41. The weather barrier of claim 39, wherein the channel seal is to seal against an inner surface of a rear door panel of a vehicle when the vehicle is in engagement with the lateral sealing member.

42. The weather barrier of claim 39, wherein the lateral seal includes a core and a covering, the core and the covering being vertically elongate, and the core being stiffer than the covering.

43. The weather barrier of claim 39, wherein the channel seal protrudes from the lateral seal in a direction away from a doorway of a loading dock when the lateral seal is in the relaxed configuration.

44. The weather barrier of claim 39, further including a tip seal provided along the tip of the lateral sealing member, the tip seal to protrude in the channel.

45. A weather barrier comprising:
 a lateral seal being vertically elongate, the lateral seal having a J-shaped cross-section defining a channel between an end of the lateral seal and a tip of the lateral seal, the lateral seal being movable between an activated configuration and a relaxed configuration, the tip to extend farther into a vehicle pathway when the lateral seal is in the relaxed configuration than when the lateral seal is in the activated configuration; and
 a channel seal positioned on the lateral seal, the channel seal protruding in a direction toward the tip of the lateral seal, the channel seal forming an air chamber when coupled to the lateral seal.

* * * * *

UNITED STATES PATENT AND TRADEMARK OFFICE
CERTIFICATE OF CORRECTION

PATENT NO. : 9,592,972 B1  
APPLICATION NO. : 14/833366  
DATED : March 14, 2017  
INVENTOR(S) : Digmann et al.

Page 1 of 1

It is certified that error appears in the above-identified patent and that said Letters Patent is hereby corrected as shown below:

On the Title Page

Item (71) add "Kevin J. Gebke, Dubuque IA" after "Ryan Withrow, Platteville, WI".

Item (72) add "Kevin J. Gebke, Dubuque IA" after "Ryan Withrow, Platteville, WI".

Signed and Sealed this  
Twentieth Day of February, 2018

Andrei Iancu  
*Director of the United States Patent and Trademark Office*